United States Patent [19]
Wychulis

[11] Patent Number: 4,983,884
[45] Date of Patent: Jan. 8, 1991

[54] CONSTANT INTENSITY LIGHT SOURCE FOR FIBER OPTIC TESTING

[75] Inventor: William C. Wychulis, Hummelstown, Pa.

[73] Assignee: AMP Incorporated, Harrisburg, Pa.

[21] Appl. No.: 400,307

[22] Filed: Aug. 29, 1989

[51] Int. Cl.[5] ........................ H05B 37/02; G01J 1/32
[52] U.S. Cl. .................................. 315/151; 315/307; 250/205
[58] Field of Search ................. 315/76, 149, 151, 158, 315/291, 307; 250/205

[56] References Cited

U.S. PATENT DOCUMENTS 4,135,116 1/1979 Smith .................................. 315/158
4,238,707 12/1980 Malissin et al. ...................... 315/175
4,329,625 5/1982 Nishizawa et al. ................. 315/158
4,423,478 12/1983 Bullock et al. ......................... 363/89
4,431,947 2/1984 Ferriss et al. ........................ 315/151
4,467,246 8/1984 Tanaka et al. ....................... 315/158
4,894,525 1/1990 Kakuta ............................ 315/158 X

*Primary Examiner*—David Mis

[57] ABSTRACT

A stable fiber optic light source is produced by a supply circuit comprising a current-producing power source 10, a comparing means 20, phase shifter 30, transistor circuit 40, light-emitting diode 50, and a feedback control system. The feedback control system comprises a mixing rod 103 for conveyance of the optical power, a splitter 16 for receiving the optical power from the mixing rod 103 and for splitting the power into fiber optic product portions 62 and 63, and a fiber optic control portion 64 and a detector 70 for sensing the optical power from the fiber optic control portion 64 and for producing, in response thereto, an electrical control signal 105 for control of the power circuit 10.

3 Claims, 4 Drawing Sheets

CONSTANT INTENSITY LIGHT SOURCE FOR FIBER OPTIC TESTING

FIELD OF THE INVENTION

This invention relates to a circuit for producing a constant intensity light source at a desired wavelength for testing of fiber optic devices such as fiber optic cables and connections.

BACKGROUND OF THE INVENTION

A stable light source is a requirement for fiber optic testing of fiber optic cables and connections. Without a stable light source, it is impossible to ascertain whether variations arise from a tested sample or the testing light source. Factors which may produce variations in the light source include temperature, source aging effects, ambient radiant energy, and electromagnetic interference. The supply circuit of the present invention provides a stable fiber optic light source by controlling the activating current to a semi-conductor light source, such as a light-emitting diode (LED), by utilizing a feedback control system. With a feedback control system, a detector is utilized to sense the energy product of the system, and the feedback loop acts to compare the product with a desired input level and, thence, in response, to adjust input energy to a level that will produce the desired intensity of product energy.

Prior art utilizing feedback looping includes Nishizawa, et al., U.S. Pat. No. 4,329,625; and Bullock, et al., U.S. Pat. No. 4,423,478, which show light sources which sample light output to control energizing voltage.

Malissin, et al., U.S. Pat. No. 4,238,707, shows the use of a photo diode to feed back an optical signal which is combined with an input voltage in an amplifier to regulate power to a laser light source. Tanaka, et al., U.S. Pat. No. 4,467,246, relates to a light quantity controller having a feedback of a light signal combined with a voltage source in an operational amplifier to adjust power to the light source. Smith, U.S. Pat. No. 4,135,116, discloses a constant illumination control system in which an optical feedback is amplified and combined with a reference voltage in a comparator to control a light dimmer. Ferriss, et al., U.S. Pat. No. 4,431,947, discloses a light controlled source circuit in which optical feedback is combined with a voltage source to regulate light intensity.

SUMMARY OF THE INVENTION

It is an object of the present invention to provide an improved controlled source circuit utilizing a feedback loop characterized by fiber optic transmission. It is further an object of the present invention to provide a constant intensity fiber optic light source suitable for the testing of fiber optic devices such as fiber optic cables, connectors, splicers and the like.

The present invention provides a supply circuit for producing a stable fiber optic light source comprising a power circuit responsive to a control signal and comprising a current producing power source, a comparing and amplifying means for comparing the voltage of the power source with the voltage of a stabilized electrical control signal, and for emitting, in response thereto, an amplified electrical signal proportional to the difference between the power source voltage and the stabilized electrical control signal voltage, and a transistor circuit coupled between the power source and the amplifier to increase or decrease current from the power source, in response to the amplified electrical signal from the amplifier; a light emitting system comprising a semi-conductor light source for generating optical power in proportion to current from the power circuit; and a feedback control system comprising means for determining a signal characteristic of the optical power generated by the semi-conductor light source; and in response thereto, generating an electrical control signal for control of the power circuit. By the present invention, the feedback control system comprises a mixing rod for conveyancing of the optical power, a splitter for receiving the optical power from the mixing rod and for splitting the power into at least a fiber optic product portion and a fiber optic control portion, and a detector for sensing the fiber optic control portion and for producing, in response thereto, the electrical control signal for control of the power circuit.

The comparing means of the supply circuit may be a high gain differential amplifying circuit that produces a electrical signal equal to the amplified difference between the voltage from the power source and the voltage from the optical detector. The detector of the feedback control system comprises a light-sensing diode and an amplifier to detect the fiber optic control portion and to produce an electrical control signal proportional thereto.

The supply circuit may further comprise a phase shifter connected to the differencing amplifier and the transistor circuit; the phase shifter, responsive to the signal from the differencing amplifier. The phase shifter includes an amplifier for increasing the closed-loop gain margin and phase margin of the supply circuit to produce a stable electrical signal to be increased or decreased by the transistor circuit.

Other advantages, features and objectives of the invention are disclosed by way of example from the following detailed description and accompanying drawings.

DESCRIPTION OF THE DRAWINGS

Referring to FIG. 1, a supply circuit for producing a stable fiber optic light source is shown to consist of functional elements 10, 20, 30, 40, 50, 60 and 70 and product 80. A conventional power source 10, with AC and DC components, is connected to a differencing amplifier 20, which compares a signal from a feedback loop, via detector 70, with a signal from power source 10. Phase shifter 30 increases the gain and, phase margin of the power signal, while the amplified signal from differencing amplifier 20 drives the transistor circuit 40 that produces a current, which is proportional to the voltage of the amplified signal. The transistor circuit 40 drives the power current through light emitting diode 50 that produces optical power proportional to the drive current. The optical power passes via a mixing rod to a splitter 60, which divides the optical power to a stabilized fiber optic output 80 and into a feedback optic power to detector 70. Detector 70 produces a voltage proportional to the input optical power, and this voltage is fed to the differencing amplifier 20 as the feedback signal. Useful is the product of this circuit. The detector 70 produces a voltage proportional to the input optical power. The voltage produced by the detector 70 is fed to the minus side of the differencing amplifier 20. The difference between the detector voltage and the AC/DC signal voltage is amplified by differencing amplifier 20 to produce an error signal that drives transistor circuit 40 to produce more or less current from the power source 10 to light emitting diode 50.

Referring to FIG. 2, is shown power source 10, differencing amplifier 20, phase shifter 30, transistor circuit 40, light-emitting diode system 50, splitter system 60 and detector 70. Differencing amplifier 20 includes operational amplifier 21, capacitors 22 and 23 and resistor 24; phase shifter 30, operational amplifier 31, capacitors 32 and 33, resistor 34 and compensation capacitor 35; and transistor circuit 40, operational amplifier 41, resistors 42 and 43 and light-emitting diode 44. Light-emitting diode system 50 comprises resistor 51, LED 52, transistor 53, resistor 54 and active mount device 55; splitter system 60, splice bushing 61, optical fibers 62, 63, and 64; and detector 70, operational amplifier 71, resistor 72, capacitor 73 and device mount 74.

Figure 1:
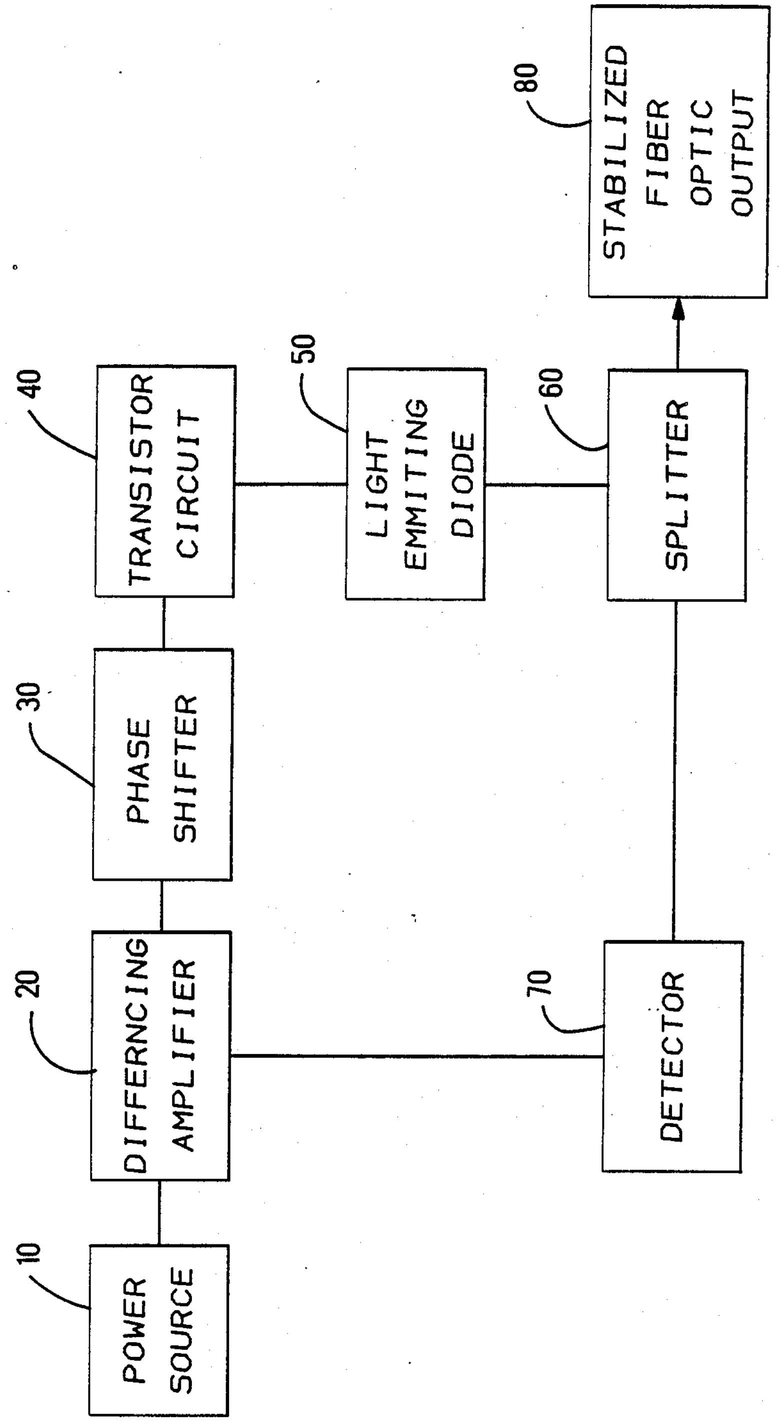
FIG. 1 is a block diagram of an embodiment of the present invention.
Figure 2:
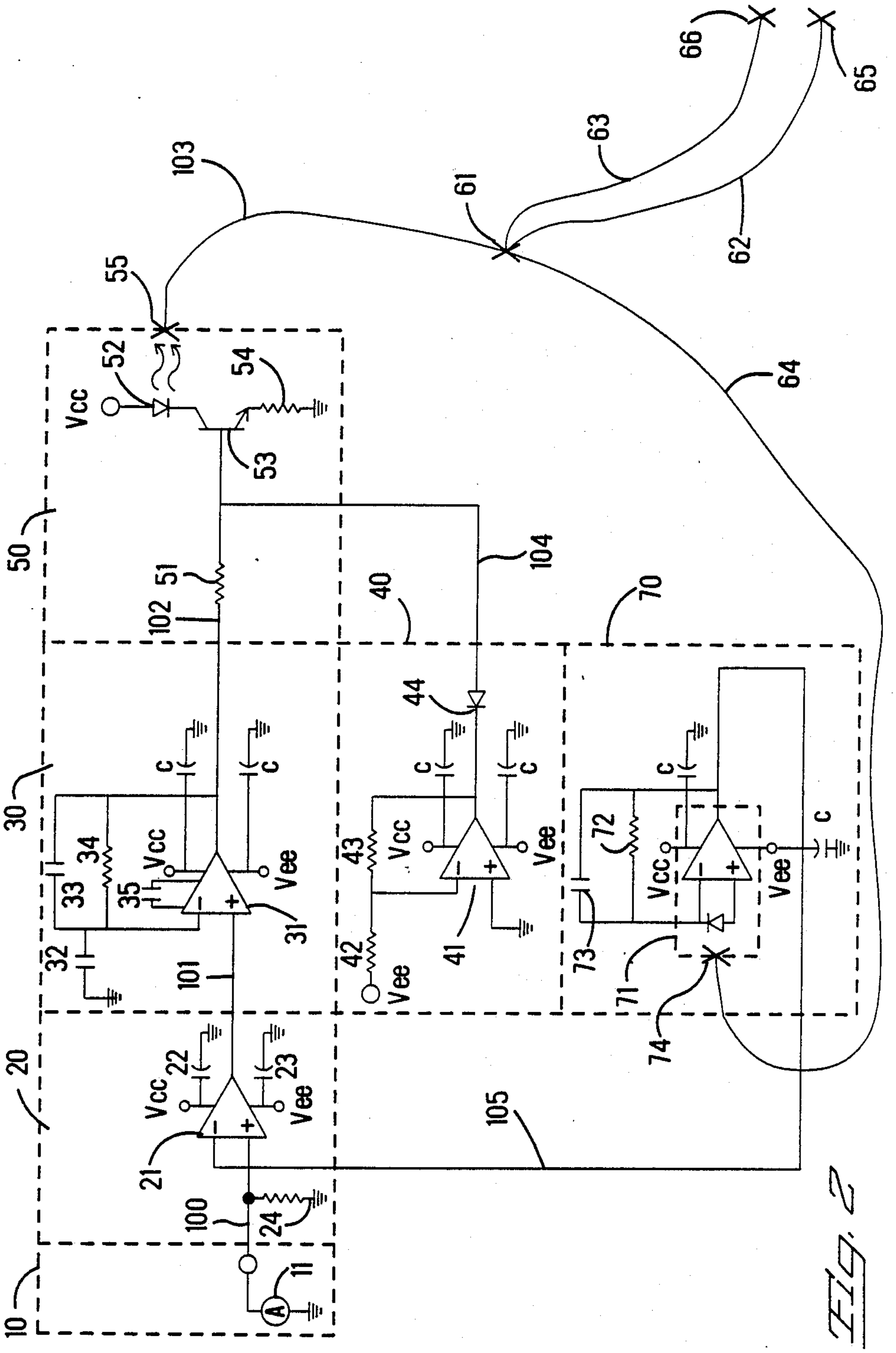
FIG. 2 is a schematic diagram of a specific embodiment of the supply circuit of FIG. 1.

In operation and again referring to FIG. 2, a commercial signal generator 11, provides a power supply 100 having positive Vcc, and negative Vee voltages to operational amplifier 21 which acts as a high-gain differential amplifier. Capacitors 22, 23 provide filtering for the Vcc and Vee power lines and resistor 24. Capacitors C are connected as shown to provide filtering for the Vcc and Vee power lines. High gain differential amplifier 21 produces an output on lead 101 that is equal to the amplified difference between the applied signal voltage 100 from 11 and the detector voltage as hereinafter described.

Phase shift amplifier 30 increases the closed-loop gain margin and phase margin of the circuit to prevent oscillation. Phase shift amplifier 30 includes operational amplifier 31, which is connected with feedback capacitors 32 and 33, feedback resistor 34 and compensation capacitor 35 having values to provide a frequency response that is flat to about 100 kHz and about 20 dB/decade of voltage gain between 100 kHz and 270 kHz. The effect of the phase shifter 30 is described further with reference to FIGS. 3 and 4.

Phase shift amplifier output 102, across resistor 51, controls LED 52. Resistor 54 allows the emitter current of transistor 53 to be controlled by the voltage at lead 102 with respect to ground. LED 52 transmits optical power at a center wavelength of about 820 nm into plastic optical fiber 103. The LED 52 is housed in an active device mount 55 that allows close proximity between the emitting surface of the LED and the face of the mixing rod 103.

Transistor circuit 40 acts as an overvoltage protector through lead 104 on lead 102, to prevent voltage from exceeding a level that would cause damage to LED 52. Operational amplifier 41, with feedback resistors 42 and 43, and the Vee DC voltage of circuit 40 act as a voltage source with negligible internal resistance on lead 104 so that LED 44 is activated at the instant that maximum voltage is exceeded to thereby cause excess voltage to appear across resistor 51 while the voltage on lead 104 remains fixed.

Mixing rod 103 is connected to splice bushing 61 to supply optical power to fibers 62, 63 and 64, assembled within a connector coupled to the splice bushing 61. Each optical fiber 62, 63 and 64 has a core size of about 100 microns and a cladding size of about 140 microns. Fibers 62 and 63 represent stabilized optical power (as hereinafter described) and are coupled to splice bushings 65 and 66 for supply to other optical fibers.

Optical power from fiber 64 is applied to a light-sensing diode 74 which produces an electrical signal to the negative size of operational amplifier 71 of detector circuit 70. Detector circuit 70 includes resistor 72 and capacitor 73. The detector circuit 70 is housed in an active device mount to receive maximum optical power from feedback optical fiber 64. Detector circuit 70 produces a voltage on lead 105 proportional to the optical power from fiber 64. Lead 105 is connected to the negative side of operational amplifier 21 of the differencing amplifier circuit 20 which compares the signals from lead 105 with the power signal from lead 100 to produce a differencing signal in lead 101 to drive transistor circuit 40, thereby producing a current in lead 102 that is proportional to the voltage of the differencing signal 101 to produce a stabilized optical output at 103.

In operation, a DC voltage is applied to the positive input 100 of operational amplifier 21, and with the use of an oscilloscope, the voltage on lead 105 is observed while the applied voltage 100 is varied until maximum symmetrical swing is obtained. The system is ready for use when these adjustments have been made and thereafter, the circuit will produce optical power 103 in proportion to the input on lead 105.

Figure 3:
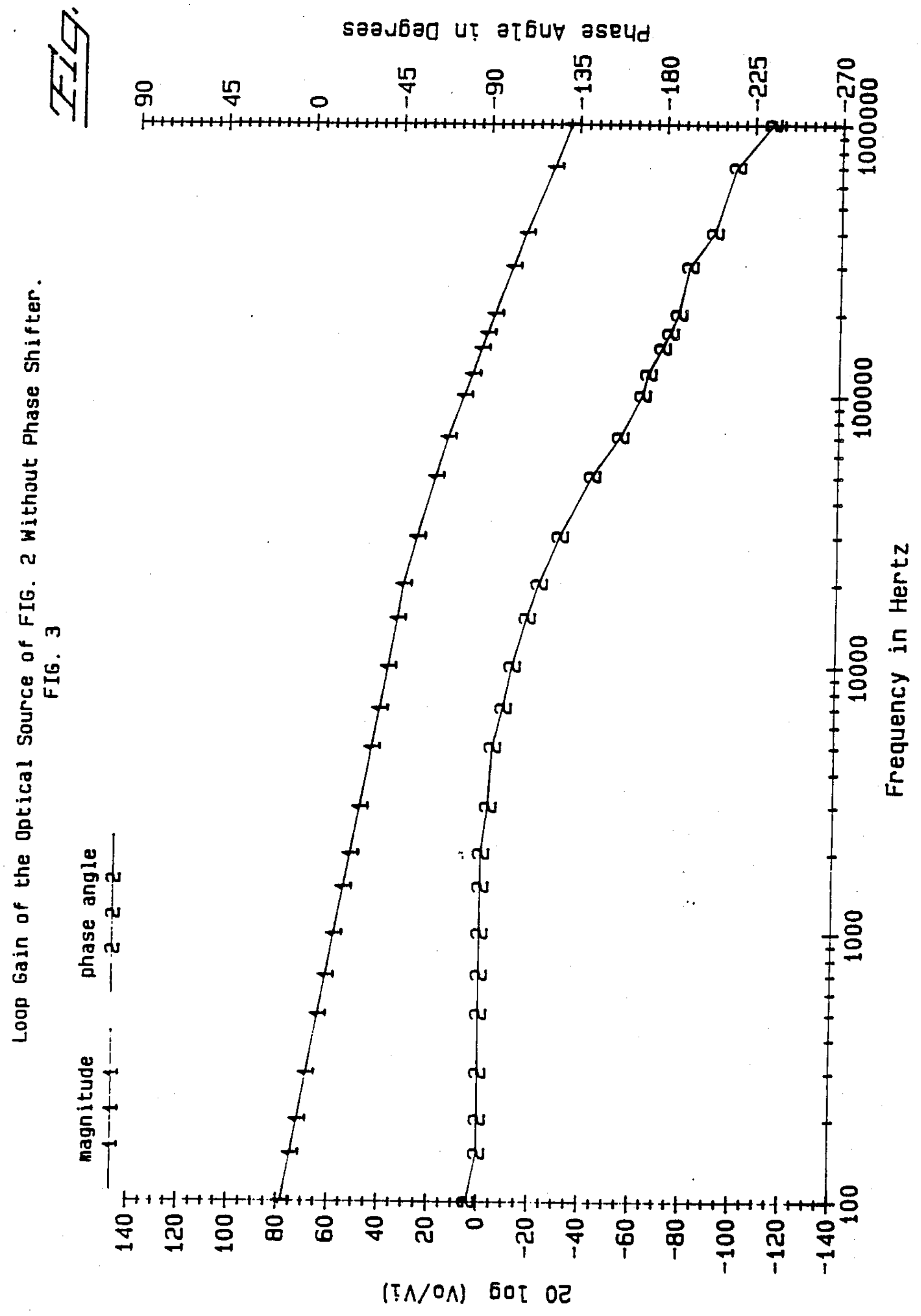
FIG. 3 is a graph showing the relationship of phase angle and magnitude to frequency for a system without a phase shifter.
Figure 4:
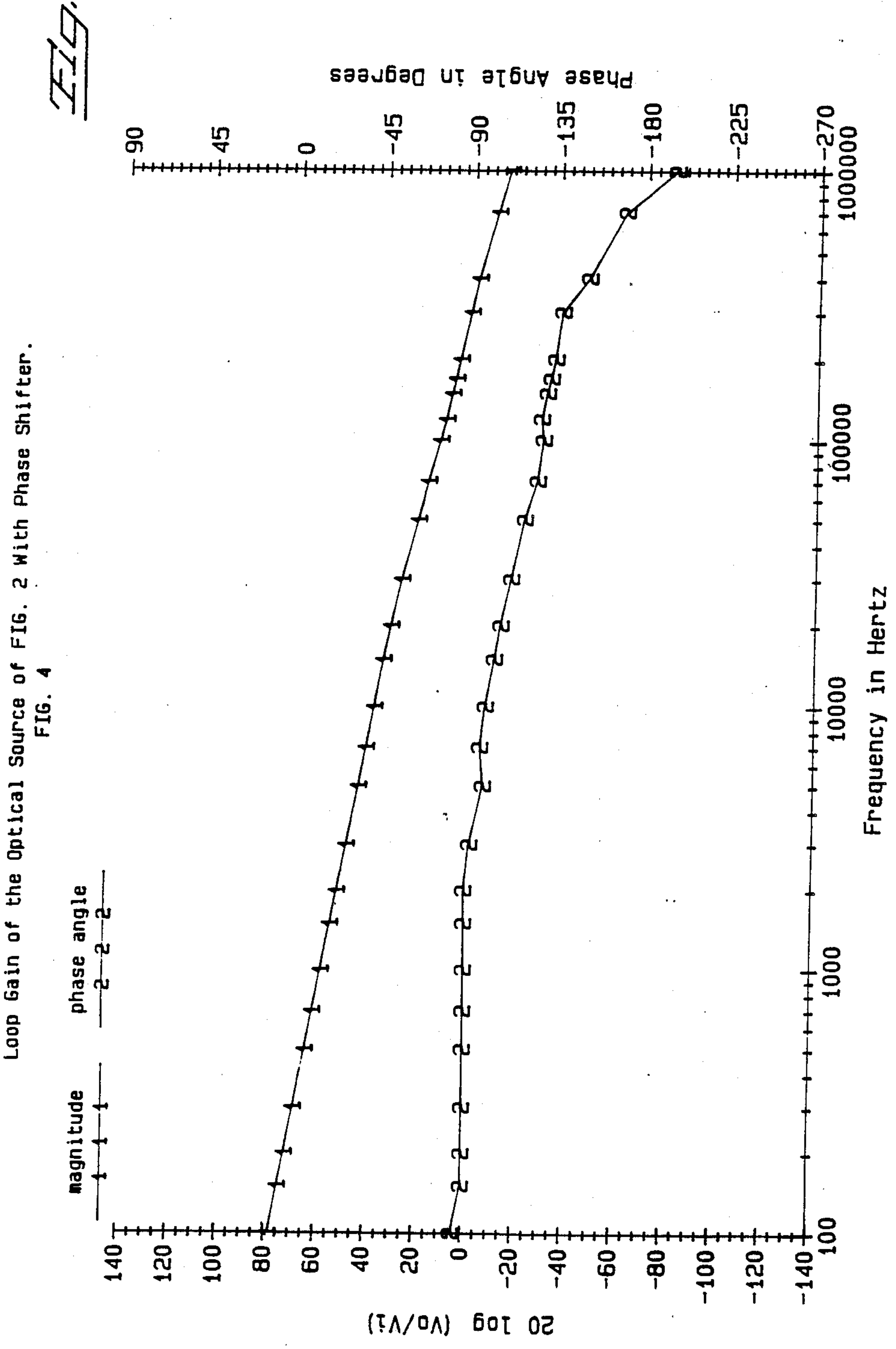
FIG. 4 is a graph showing the relationship of phase angle and magnitude to frequency for a system of the present invention.

Referring to FIGS. 3 and 4, shown are plots of phase angle in degrees to frequency in Hertz, illustrating loop gain of the constant intensity light source circuit with and without phase shifter 30. In FIG. 3, without phase shifter 30, 0 dB crossing occurs at about 176 kHz, and the 180 degree phase shift takes place at about 158 kHz, illustrating 180 degree phase shift at a frequency lower than the 0 dB crossing and an unstable circuit with oscillation at about 158 kHz. With phase shift circuit 30, as illustrated in FIG. 4, the 0 dB crossing occurs at 325 kHz, and the 180 degree phase shift takes place at 815 kHz, illustrating a significant improvement in the stability of the circuit with the shift occurring at a frequency much higher than the 0 dB crossing, with a gain margin of about 39 degrees and a phase margin of about 10 dB.

I claim:

1. A supply circuit for a stable fiber optic light comprising;

a power circuit responsive to a control signal and comprising a power source, a comparing and amplifying means for comparing the voltage of the power source with the voltage of a stabilized electrical control signal and for emitting, in response thereto, an amplified electrical signal proportional to the difference between the power source voltage and the stabilized electrical control signal voltage, and a transistor circuit to increase or decrease the current from the power source in response to the amplified electrical signal from the comparing and amplifying means; and a stable light-emitting system comprising a semi-conductor light source for generating optical power in proportion to the signal from the power circuit, and a feedback control system comprising means for determining a signal characteristic of the optical power generated by the semi-conductor light source and in response thereto, generating the electrical control signal for control of the power circuit as aforesaid; wherein the feedback control system comprises;

a mixing rod for conveyance of the optical power, a splitter for receiving the optical power from the mixing rod and for splitting the power into at least a fiber optic product portion and a fiber optic control portion, and a detector for sensing the fiber optic control portion and for producing, in response thereto, the electrical control signal for control of the power circuit.

2. The supply circuit of claim 1 further comprising a phase shifter connected to the comparing and amplifying means and the transistor circuit and responsive to the amplified signal from the comparing and amplifying means, said phase shifter including an amplifier for increasing the closed-loop gain margin and phase margin of the supply circuit to produce a stable current to be increased or decreased by said transistor circuit.

3. The supply circuit of claim 2 wherein the detector of the feedback control system comprises a light-sensing diode and an operational amplifier to detect the fiber optic control portion and to produce an electrical control signal proportional thereto.

* * * * *